(12) United States Patent
Kitamura et al.

(10) Patent No.: US 6,315,142 B1
(45) Date of Patent: Nov. 13, 2001

(54) FITTING PIECE AND PORTABLE TERMINAL DEVICE USING THE SAME

(75) Inventors: Toshiyasu Kitamura, Kanagawa; Kazuhiro Konishi, Shizuoka; Makoto Tamaru, Kanagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/499,540

(22) Filed: Feb. 7, 2000

(30) Foreign Application Priority Data

Feb. 12, 1999 (JP) .................................................. 11-034700

(51) Int. Cl.⁷ ..................................................... B65D 11/00
(52) U.S. Cl. ........................ 220/4.02; 220/4.26; 220/324; 220/326
(58) Field of Search ................................. 220/4.02, 4.21, 220/4.24, 4.26, 324, 326

(56) References Cited

U.S. PATENT DOCUMENTS

| | | | |
|---|---|---|---|
| 4,212,415 | * | 7/1980 | Neely ................................. 220/4.26 X |
| 5,531,345 | * | 7/1996 | Nakamura et al. ................. 220/326 X |
| 5,547,095 | * | 8/1996 | Sonntag et al. ................... 220/4.02 X |
| 5,551,589 | * | 9/1996 | Nakamura ............................. 220/326 |
| 5,577,779 | * | 11/1996 | Dangle .............................. 220/326 X |
| 5,613,237 | * | 3/1997 | Bent ................................ 220/4.02 X |

* cited by examiner

Primary Examiner—Steven M. Pollard
(74) Attorney, Agent, or Firm—Pearne & Gordon LLP

(57) ABSTRACT

A portable terminal device, capable of improving the releasing property of fitting pieces of an upper case and a lower case at the time of disassembling the appliance, and lowering generation of deformation or crack of the main body by bend or twist while maintaining a sufficient fitting holding force. In the main body of the portable terminal device, a plurality of fitting pieces are provided each in an upper case and a lower case for holding and fixing with each other. The fitting pieces have a fitting horizontal surface to be substantially parallel for holding with each other when the upper case and the lower case are engaged. A part of the fitting horizontal surface of the fitting pieces of at least one of the upper case and the lower case has a fitting twisted surface twisted in the direction away from the fitting horizontal surface of the other fitting piece in the fitting pieces. In releasing the fitting pieces of the upper case and the lower case at the time of disassembling the main body in the portable terminal device having the configuration, the fitting piece without the fitting twisted surface is gradually released along the fitting twisted surface of the fitting piece having the fitting twisted surface.

10 Claims, 10 Drawing Sheets

C-VIEW

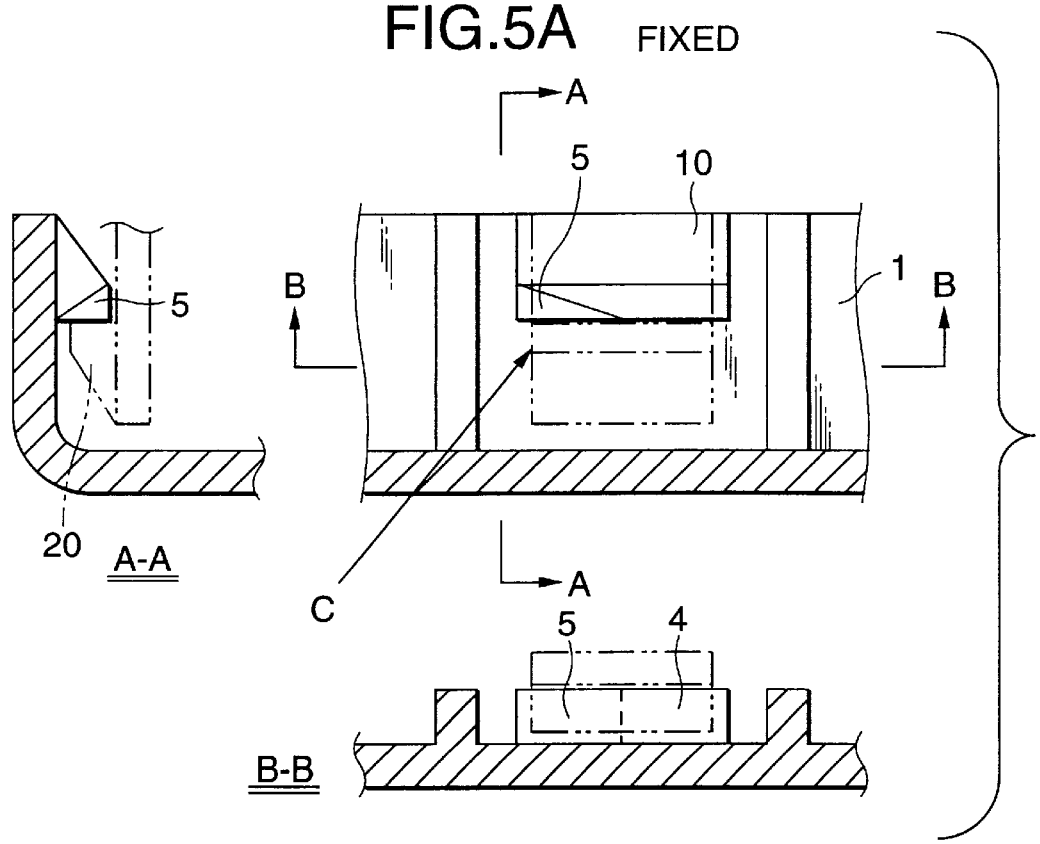
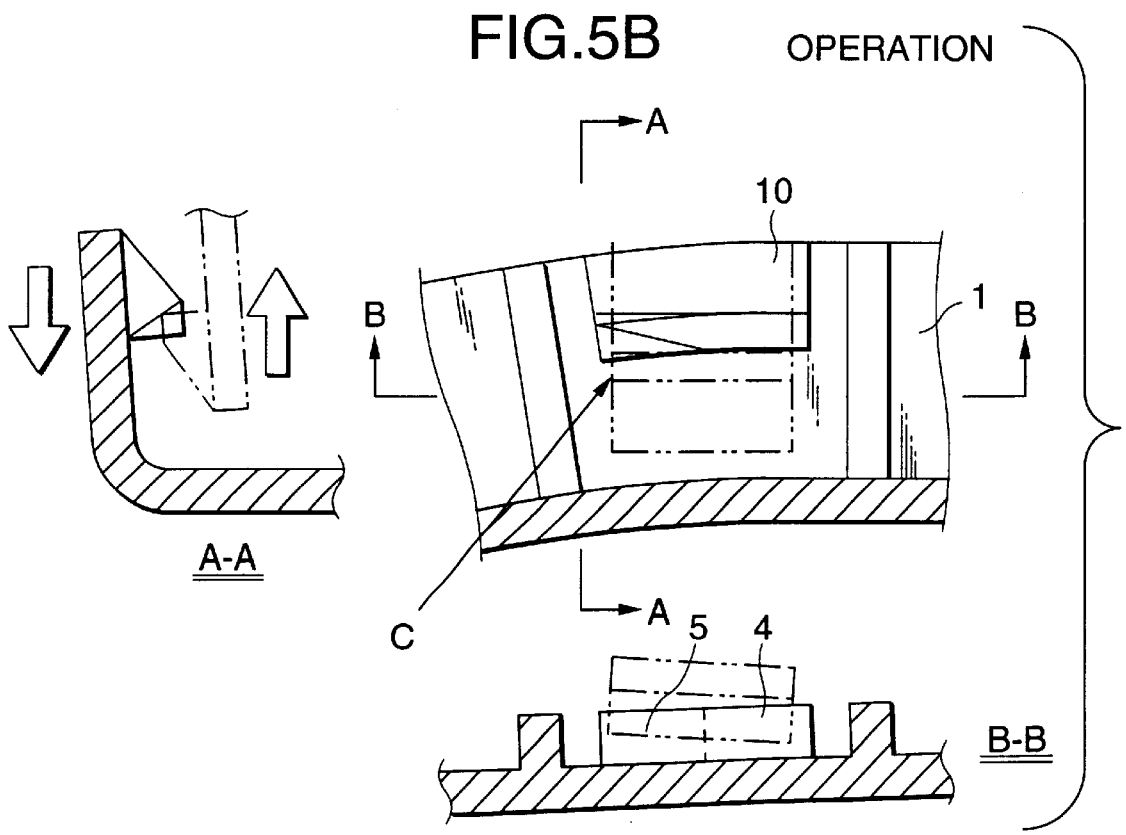

FITTING PIECE WITH TWISTED SURFACE

FITTING PIECE WITHOUT TWISTED SURFACE

C-VIEW

C-VIEW

FITTING PIECE AND PORTABLE TERMINAL DEVICE USING THE SAME

BACKGROUND OF THE INVENTION

The present invention relates to a fitting piece structure of a main body of a portable terminal appliance, such as a portable phone, in particular it relates to a configuration provided with a twisted surface in a part of a fitting surface of a fitting piece for improving the disassembling property of a main body case.

Recently, manufacturers of portable terminal appliances, such as portable phones are actively striving for the new product development for achieving a smaller size, a lightweight and a thinner shape. According to the trend, the mechanical strength of the product tends to be weak due to a thinner shape of the housing and deterioration of the rigidity of the main body. Moreover, since the number of repair of the troubled products on market increases according to the increase of the spread ratio with respect to the population year by year so as to increase the number of terminals, improvement of the disassembling property and maintenance property of the terminals is called for.

Hereinafter, a conventional fitting piece structure of a main body of a portable terminal device, such as a portable phone will be explained hereinafter.

The conventional fitting piece structure of the main body of the portable phone will be described with reference to FIGS. 1, 7A, 7B, 10 and 11. In FIG. 1, thee portable phone comprises an upper case 1, a lower case 2 and an internal unit 30. For engagement of the upper case 1 and the lower case 2, a fitting piece 3 as shown in FIG. 7B is used. In the case of the engagement using the fitting piece 3, a fitting horizontal surface 4 having vertices U-V-X-Y is formed as shown in FIGS. 10 and 11.

Operation of the portable terminal device with the configuration will be explained. The upper case 1 and the lower case 2 are engaged with the internal unit 30 inserted therebetween. At the time, the upper case 1 and the lower case 2 are held and fixed by fitting the fitting pieces, 3 of the upper case 1 and the lower case 2 with respect to the fitting horizontal surface 4 of the corresponding fitting piece 3.

Operation in disassembling for repair will be explained. The upper case 1 and the lower case 2 held by the fitting piece 3 shown in FIG. 7B are divided against to the fitting force of the fitting piece 3. The operation force characteristic at the time of the release is shown in FIG. 7A. That is, since the cases cannot be disassembled until a certain load is applied but there is a risk of damage or breakage if the cases are disassembled forcibly, they need to be disassembled by handling with care for gradually releasing the fitting between each fitting piece 3 and the corresponding fitting piece 3 in the upper case 1 and the lower case 2 for preventing damage or breakage.

Accordingly, since the fitting pieces cannot be released easily at the time of disassembling although the upper and lower cases are held preferably by the fitting pieces of the main body in the conventional configuration, a problem is involved in that damage or breakage of the main body case can easily be generated due to a bend or twist mode at the time of disassembling a product on market.

SUMMARY OF THE INVENTION

In order to solve the conventional problems, an object of the invention is to provide an excellent portable terminal device with a small size, capable of improving the releasing property of fitting pieces of an upper case and a lower case at the time of disassembling the appliance, and lowering generation of deformation or crack of the main body by bend or twist while maintaining a sufficient fitting holding force.

In order to achieve the object, according to the configuration of a portable terminal device of the invention, fitting pieces are provided in an upper case and a lower case of a main body for holding and fixing with each other, the fitting pieces are provided with a fitting horizontal surface to be substantially parallel when the upper case and the lower case are engaged, and a part of the fitting horizontal surface of the fitting pieces of at least one of the upper case and the lower case has a fitting twisted surface twisted in the direction away from the fitting horizontal surface of the other fitting piece.

Since a first aspect of the invention is a portable terminal device comprising an upper case, a lower case, and an internal unit, wherein fitting pieces are provided in both upper case and lower case for holding and fixing with each other, the fitting pieces are provided with a fitting horizontal surface to be substantially parallel when the upper case and the lower case are engaged, and a part of the fitting horizontal surface of the fitting pieces of at least one of the upper case and the lower case has a fitting twisted surface twisted in the direction away from the fitting horizontal surface of the other fitting piece, the effect of improving the releasing property of the fitting pieces of the upper case and the lower case at the time of disassembling the appliance can be achieved by gradually releasing the fitting pieces without the twisted surface along the twisted surface of the fitting piece having the twisted surface in releasing the fitting pieces of the upper and lower cases at the time of disassembling the main body.

Moreover, since a second aspect of the invention is a portable terminal device comprising an upper case, a lower case, and an internal unit, wherein fitting pieces are provided on three sides of the inner wall of the outer periphery of the upper case and the lower case for holding and fixing the upper case and the lower case with each other, the fitting pieces on the three sides are provided with a fitting horizontal surface to be substantially parallel when the upper case and the lower case are engaged, and a part of the fitting horizontal surface of the fitting pieces in two sides facing with each other among the fitting pieces on the three sides of at least one of the upper case and the lower case has a fitting twisted surface twisted in the direction away from the fitting horizontal surface of the other fitting piece, the effect of improving the releasing property of the fitting pieces of the upper case and the lower case at the time of disassembling the appliance can be achieved by gradually releasing the fitting pieces without the twisted surface along the twisted surface of the fitting piece having the twisted surface in releasing the fitting pieces of the upper and lower cases at the time of disassembling the main body as well as the effect of lowering the chance of generating deformation or crack of the main body by bend or twist can be achieved while maintaining a sufficient holding force.

Furthermore, since a third aspect of the invention is the portable terminal device, wherein the fitting pieces having the fitting twisted surface provided in the two sides facing with each other of at least one of the upper case and the lower case are provided with the fitting horizontal surface at the end closer to the fitting pieces provided in the side other than the two sides facing with each other among the outer peripheral three sides of the upper case and the lower casein the substantially perpendicular direction, and the fitting twisted surface is provided in the direction away from the fitting pieces, the effect of improving the releasing property of the fitting pieces of the upper case and the lower case at the time of disassembling the appliance and lowering the chance of generating deformation or crack of the main body by bend or twist can be achieved.

Moreover, since a fourth aspect of the invention is the portable terminal device, wherein at least one pair of the fitting pieces having the fitting twisted surface are provided in the two sides facing with each other of the upper case and the lower case, the effect of improving the releasing property of the fitting pieces of the upper case and the lower case at the time of disassembling the appliance and lowering the chance of generating deformation or crack of the main body by bend or twist while maintaining a sufficient holding force can be achieved.

Furthermore, since a fifth aspect of the invention is the portable terminal device, wherein the fitting twisted surface starts to be twisted from the substantial center of the fitting surface of the fitting piece in the fitting pieces having the fitting twisted surface, the effect of improving the releasing property of the fitting pieces of the upper case and the lower case at the time of disassembling the appliance and lowering the chance of generating deformation or crack of the main body by bend or twist while maintaining a sufficient holding force can be achieved.

Moreover, since a sixth aspect of the invention is a portable radio electronic appliance comprising the fitting piece structure according to any of the first to fifth aspects, the effect of improving the releasing property of the fitting pieces of the upper case and the lower case at the time of disassembling the appliance and lowering the chance of generating deformation or crack of the main body by bend or twist while maintaining a sufficient holding force can be achieved in the portable radio electronic appliance.

BRIEF DESCRIPTION OF THE DRAWINGS

FIGS. 5A and 5B are cross-sectional views for explaining operation of the fitting piece structure of the portable terminal device according to the embodiment of the invention;

DETAILED DESCRIPTION OF THE PREFERRED EMBODIMENTS

Hereinafter an embodiment of the invention will be explained with reference to the accompanied drawings.

Figure 1:
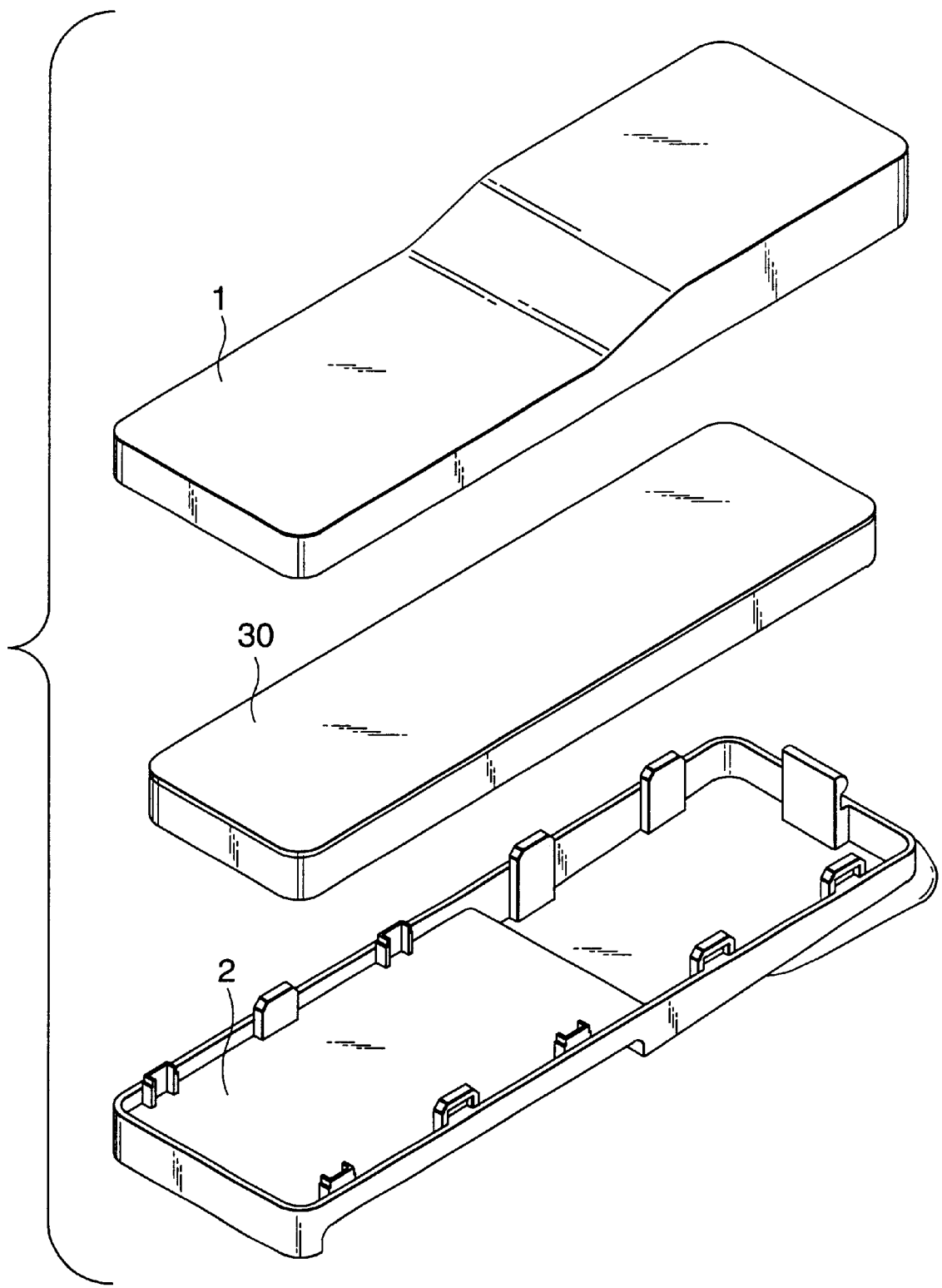
FIG. 1 is a perspective view showing the entire configuration of a portable terminal device according to an embodiment of the invention.

FIG. 1 is a perspective view showing the entire configuration of a portable terminal device according to an embodiment of the invention. In FIG. 1, the portable terminal device comprises an upper case 1, a lower case 2 and an internal unit 30. The fitting piece structure of the portable terminal device with the configuration will be explained with reference to FIG. 2.

Figure 2A:
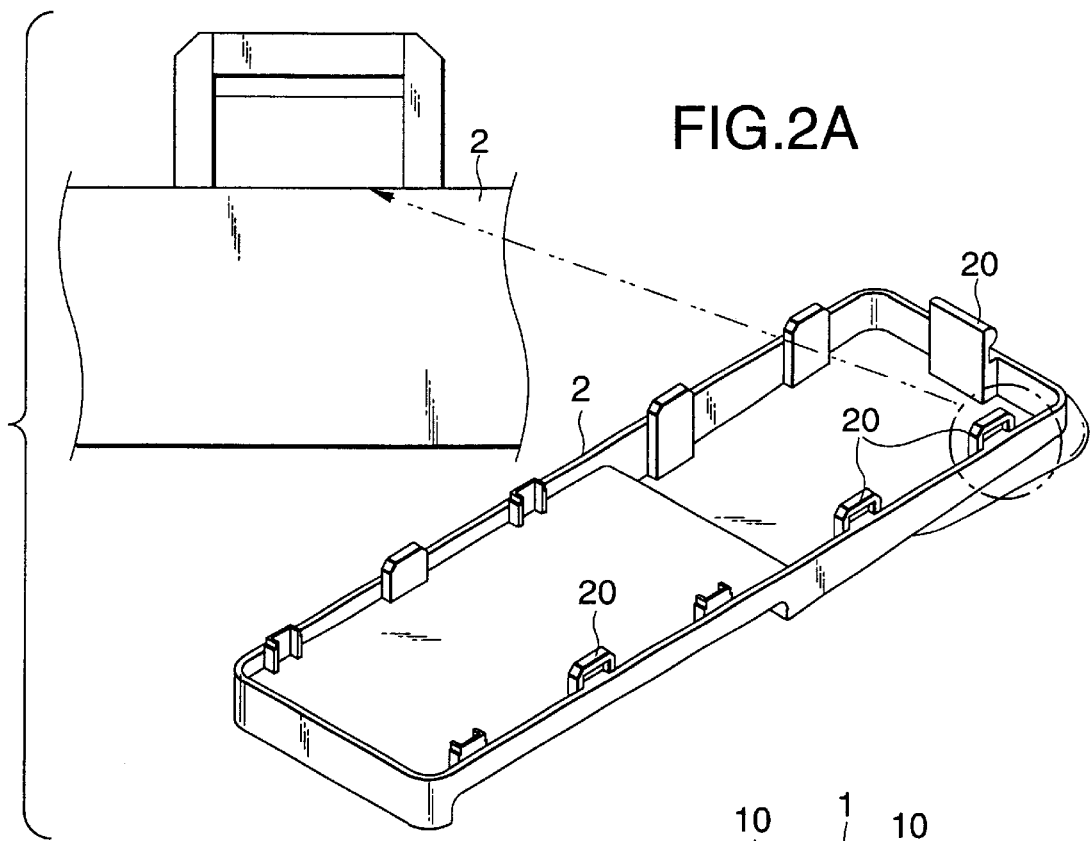
FIGS. 2A and 2B are perspective views showing details of the entire configuration of the upper case and the lower case of the portable terminal device according to the embodiment of the invention.
Figure 2B:
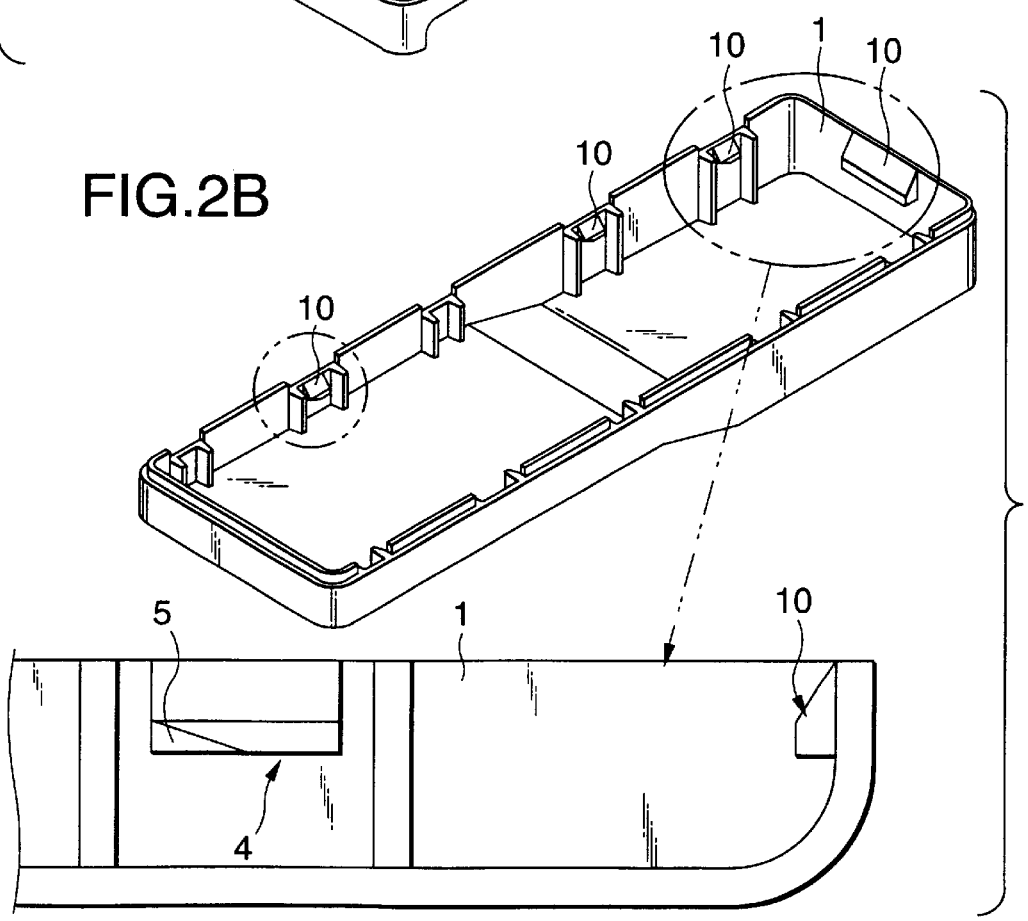

FIG. 2 is a perspective view showing details of the entire configuration of a portable terminal device, such as a portable phone according to the embodiment of the invention. Fitting pieces 10 of the upper case 1 and fitting pieces 20 of the lower case 2 comprising the fitting piece structure are shown. Accordingly, the fitting pieces 10, 20 are provided for holding and fixing the upper case 1 and the lower case 2 of the portable phone with each other. A fitting twisted surface 5 (see FIGS. 3 and 4) is provided in a part of the fitting horizontal surface 4 of either the fitting pieces 10 or the fitting pieces 20. The case with the fitting twisted surface 5 provided in the fitting pieces 10 of the upper case 1 will be explained herein, but it is needless to say that the fitting twisted surface 5 can be provided in the fitting pieces 20 of the lower case 2.

FIG. 2 also shows the state in the fitting pieces 10 having the fitting twisted surface 5 provided in two sides of the upper case 1 facing with each other, of providing the fitting horizontal surface 4 at the end closer to the fitting piece 10-(1) in the substantially perpendicular direction and providing the fitting twisted surface 5 in the direction away from a fitting piece 10-(1) provided in a side other than the two sides facing with each other among the three sides of the outer periphery of the upper case.

Figure 3:
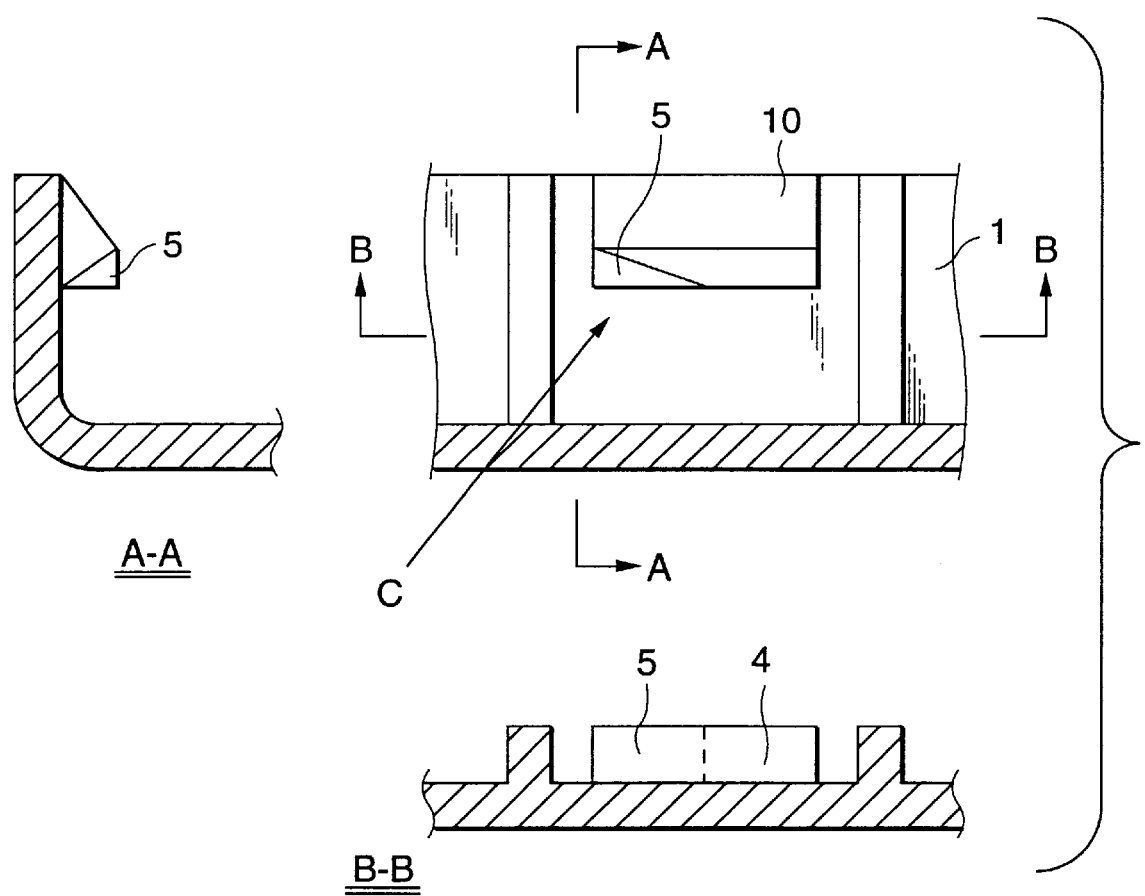
FIG. 3 is a cross-sectional view showing the fitting piece structure of the portable terminal device according to the embodiment of the invention.

FIG. 3 is a cross-sectional view showing the fitting piece structures of the portable terminal device according to the embodiment of the invention, wherein the fitting twisted surface 5 is provided in a part of the fitting horizontal surface 4 of the fitting piece 10 in the upper case 1. The cross-sections taken on the line A—A and the line B—B of the portion are shown. Moreover, the shape is shown three-dimensionally in a perspective view of FIG. 4, viewed from the arrow C direction.

Figure 4:
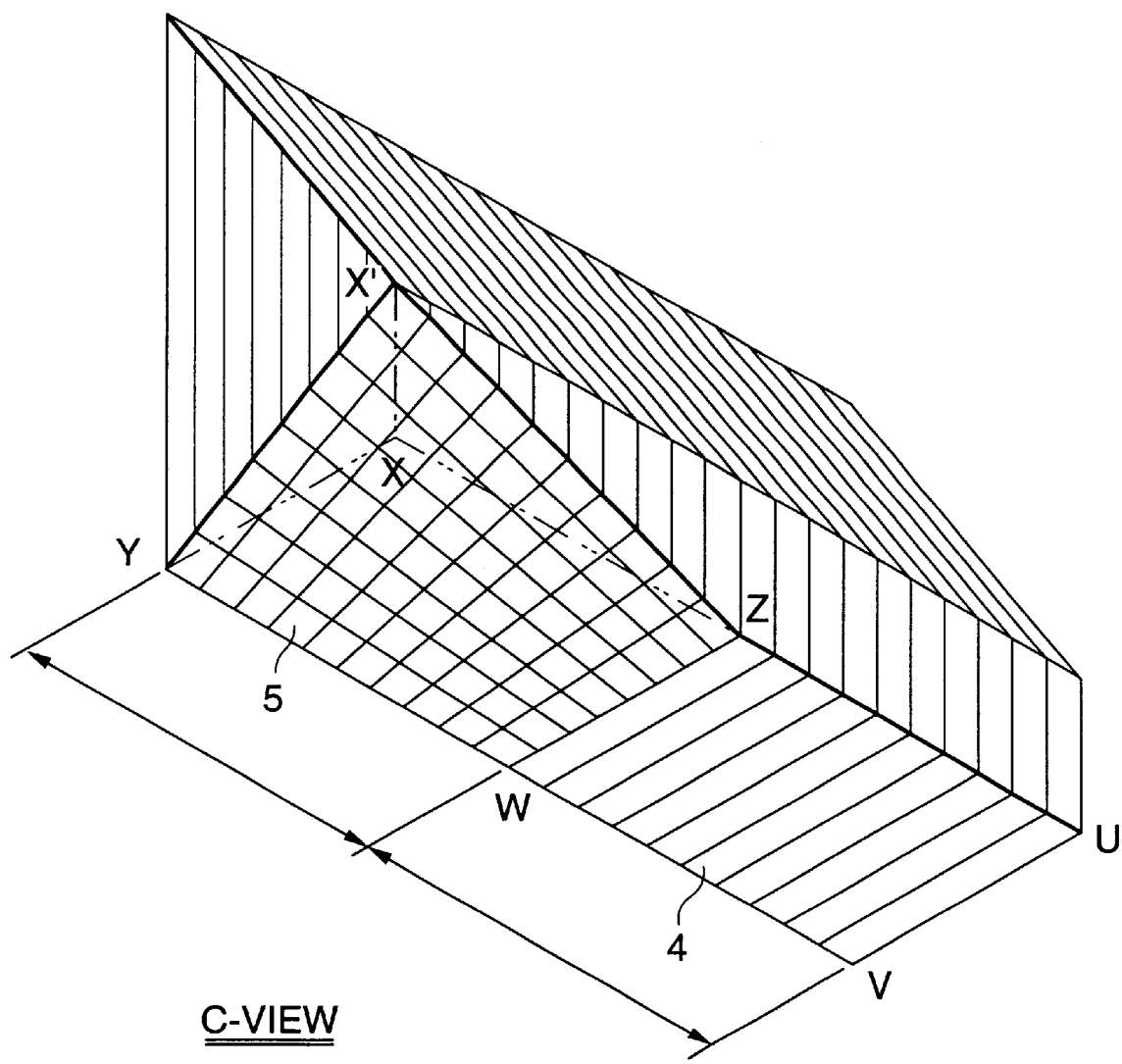
FIG. 4 is a perspective view showing details of the entire configuration of the fitting piece of the portable terminal device according to the embodiment of the invention.
Figure 11:
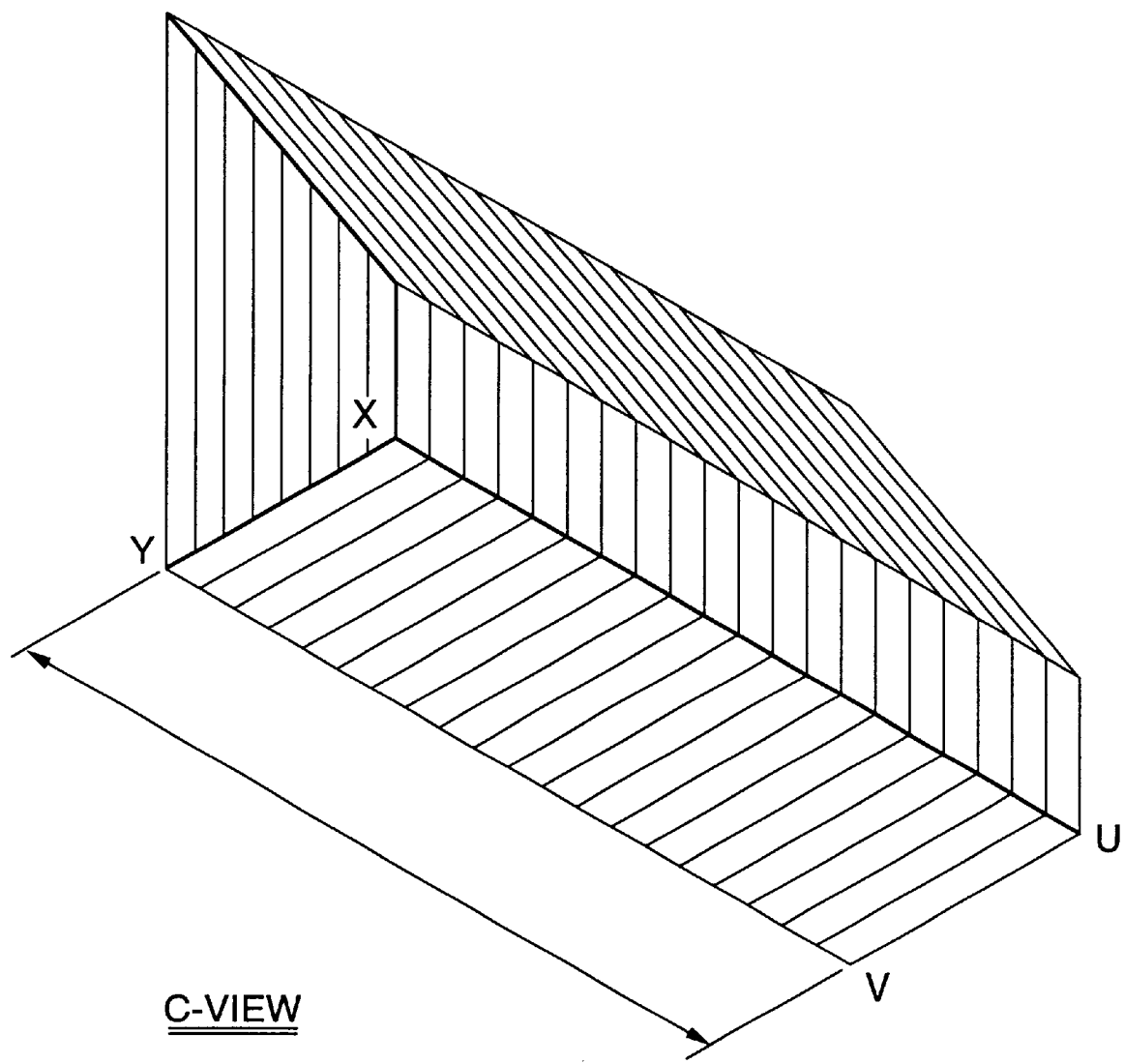
FIG. 11 is a perspective view showing details of the fitting piece structure of the conventional portable terminal device.

In the case the fitting horizontal surface 4 of the fitting piece 10 is not provided with the fitting twisted surface 5, it comprises the UVXY surface (see also FIG. 11), however, the WZX'Y surface to be the fitting twisted surface 5 is formed in a part from WZ of the fitting horizontal surface 4 of FIG. 4 in the case of the invention.

Operation of the portable terminal device having the upper case 1 and the lower case 2 provided with the fitting pieces 10 of the configuration will be explained with reference to FIG. 5.

FIG. 5A shows the state wherein the fitting pieces 10, 20 of the upper case 1 and the lower case 2 are fitted (fixed).

FIG. 5B shows the state wherein the fitting pieces 10, 20 are about to be released so as to separate the upper case 1 and the lower case 2 for disassembling the appliance main body for repair (operation). It is shown in FIG. 5B that the fitting pieces 20 of the lower case 2 are gradually released along the fitting twisted surface 5 provided in the fitting pieces 10 of the upper case 1 so as to be released completely.

Figure 6A:
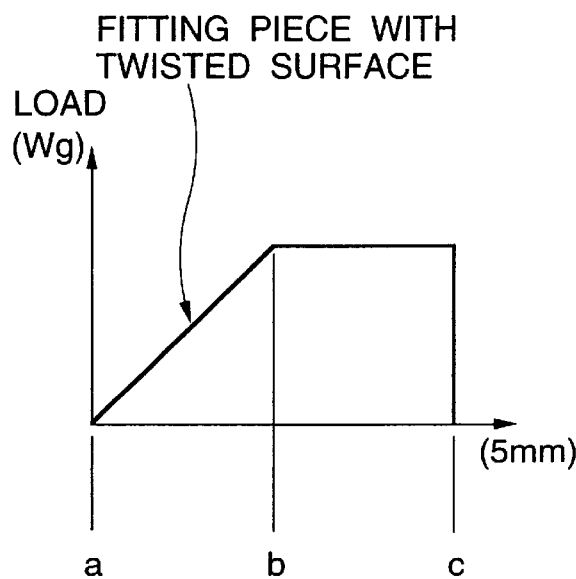
FIGS. 6A and 6B are a graph for explaining the fitting piece structure and the operation force of the fitting piece structure of the portable terminal device according to the embodiment of the invention.
Figure 6B:
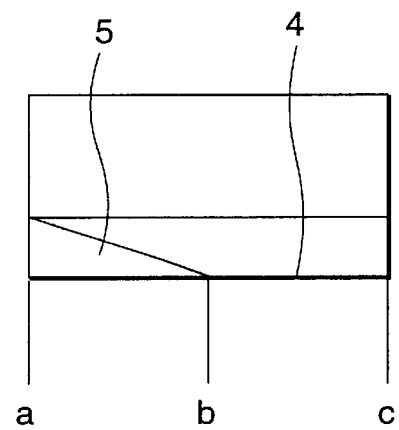
Figure 7A:
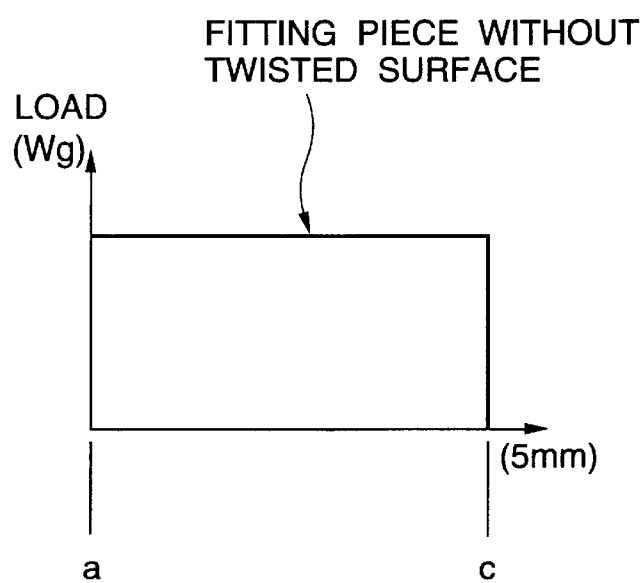
FIGS. 7A and 7B are a graph for explaining the fitting piece structure and the operation force of the fitting piece structure of a conventional portable terminal device.
Figure 7B:
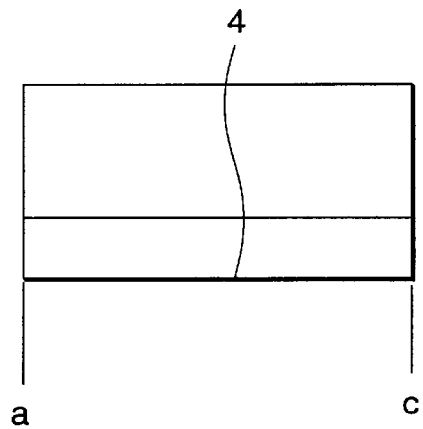

FIGS. 6A and 7A show the operation force characteristic at the time of releasing the fitting pieces 10, 20 according to the embodiment and the operation force characteristic at the time of releasing the conventional fitting pieces 3 in comparison. FIG. 6A shows the operation force characteristic at the time of releasing the fitting pieces according to the embodiment. The graph of the figure shows the relationship between the position of the fitting piece and the operation force (resistance) applied at the time of release. As is shown in the graph, in the case of the fitting piece having the twisted surface of the invention, the operation force applied for release hardly generates at the time of starting the release, that is, the fitting piece 20 of the lower case 2 starts to be released along the fitting twisted surface 5 (point a), the operation force increases according to progress of the release along the fitting twisted surface 5, the operation force becomes maximum at the time of reaching the fitting horizontal surface 4 without the fitting twisted surface 5 (point b), and thereafter the operation force becomes 0 at the time of reaching the end portion of the fitting piece (point c) so as to completely release the fitting pieces 10, 20 of the upper case 1 and the lower case 2.

On the other hand, FIG. 7A shows the conventional operation force characteristic at the time of releasing the fitting pieces. The graph of the figure shows the relationship between the position of the fitting piece and the operation force applied at the time of release like FIG. 6A. As is shown in the graph, in the case of the conventional fitting piece, the operation force applied for release is already maximum at the time of starting the release, that is, starting the release by contacting the fitting horizontal surface 4 of the fitting piece 3 of the lower case with the fitting horizontal surface 4 (point a). This state continues during progress of the release, and thereafter, the operation force becomes 0 at the time of reaching the end portion of the fitting piece (point c) so as to completely release the fitting pieces 3 of the upper case 1 and the lower case 2.

As apparent from FIGS. 6A and 7A, since the fitting piece structure according to the embodiment can lower the operation force applied at the time of starting release of the fitting piece in separating the upper case 1 and the lower case 2, an excellent effect of improving the releasing property of the fitting pieces can be achieved.

Figure 8:
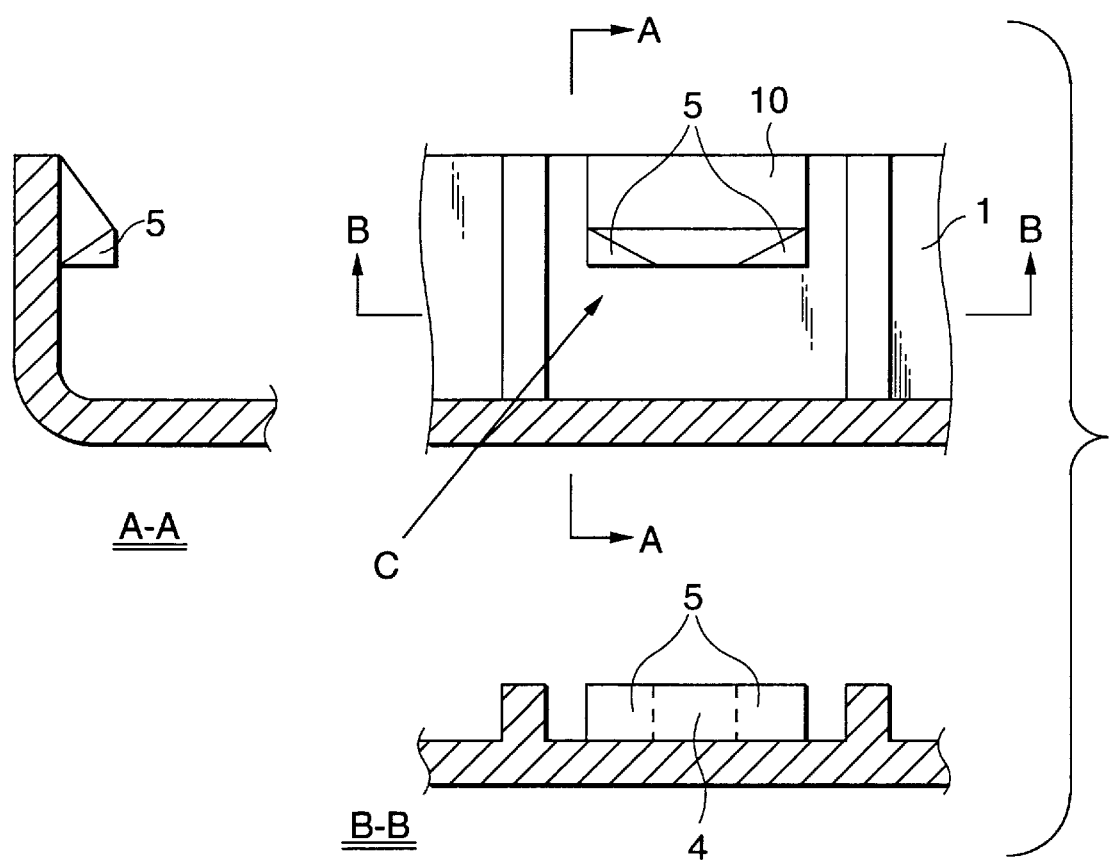
FIG. 8 is a cross-sectional view showing the fitting piece structure of the portable terminal device according to another embodiment of the invention.
Figure 9:
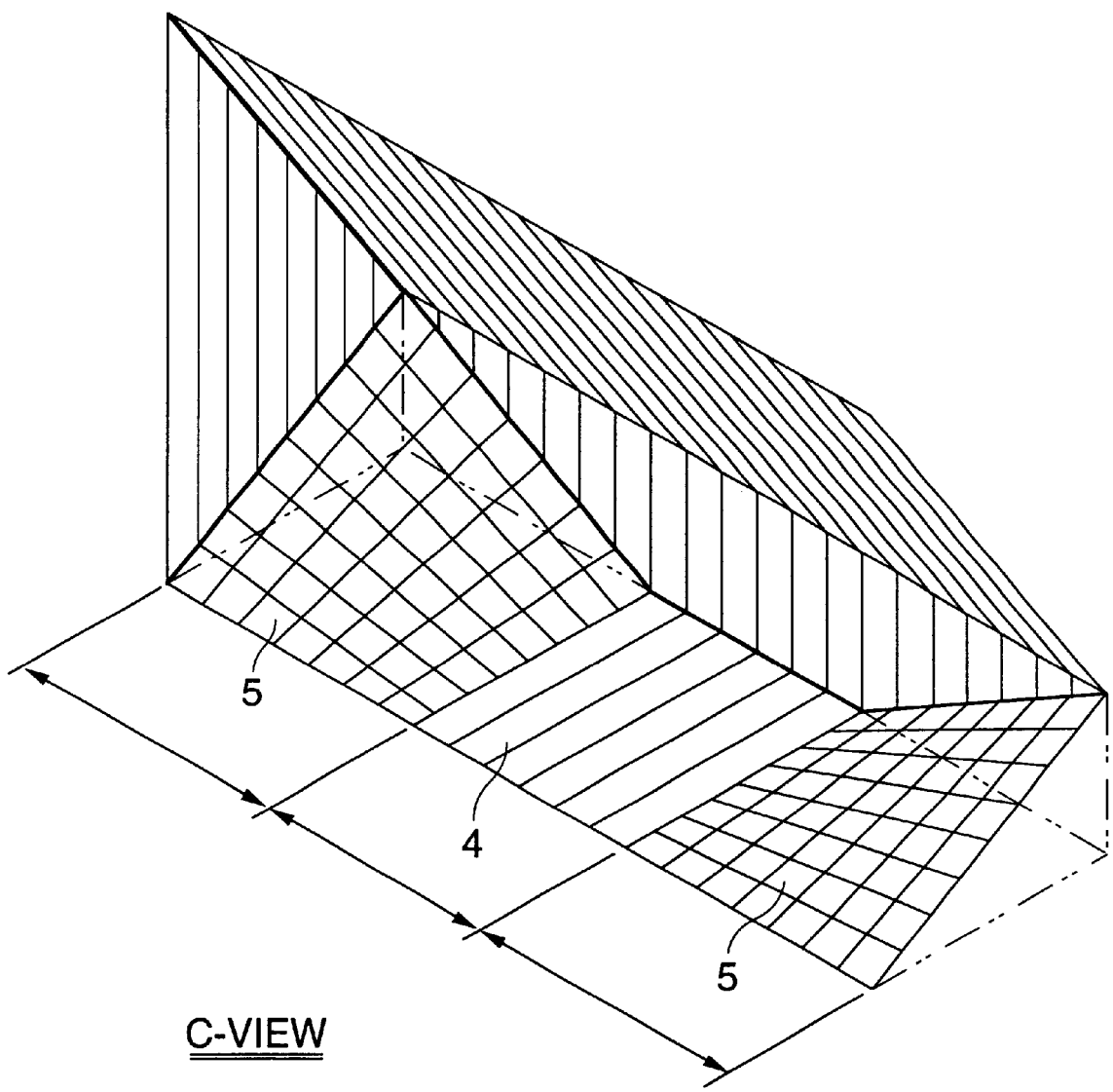
FIG. 9 is a perspective view showing details of the entire configuration of the fitting piece of the portable terminal device according to the embodiment of the invention.
Figure 10:
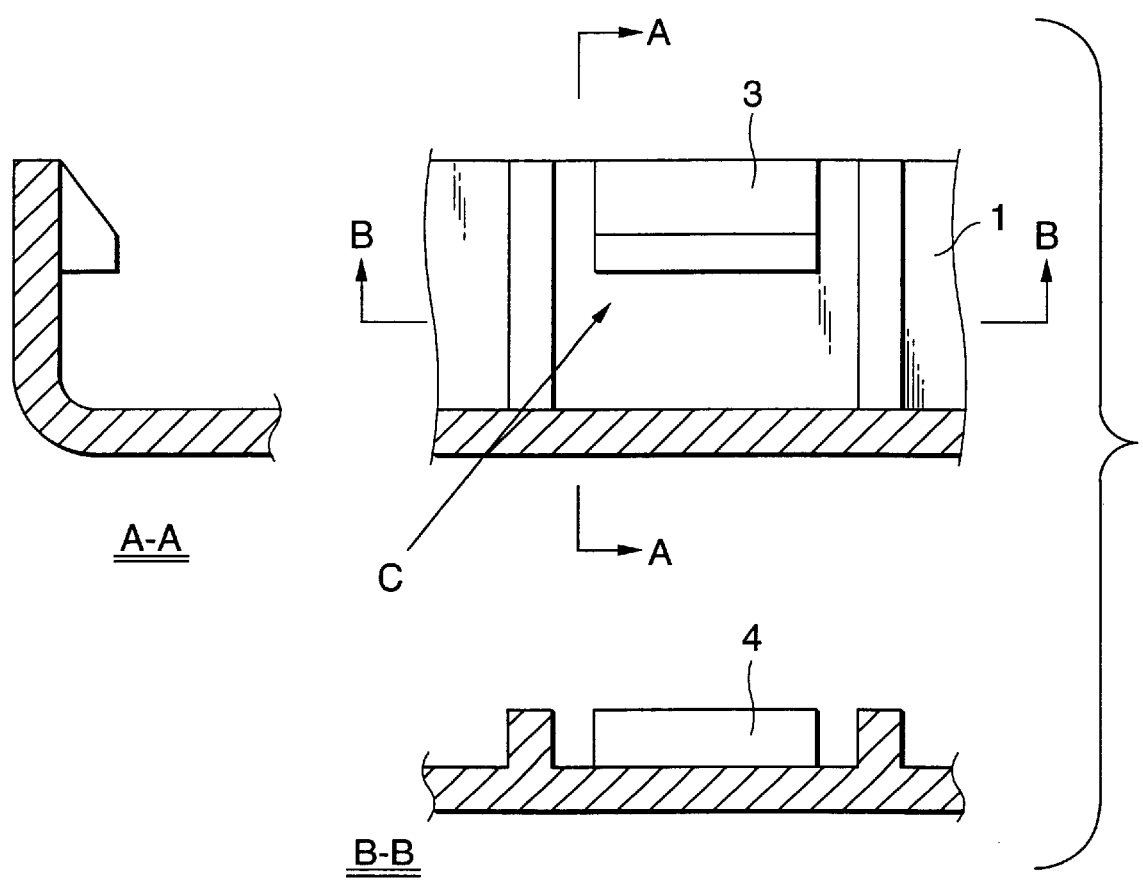
FIG. 10 is a cross-sectional view showing the fitting piece structure of the conventional portable terminal device.

FIG. 8 is a cross-sectional view showing the fitting piece structures of the portable terminal device according to another embodiment of the invention. FIG. 9 is a perspective view showing details of the fitting piece structure of the portable terminal device according to the embodiment of the invention, wherein the fitting twisted surface 5 is provided in two portions of the fitting horizontal surface 4 of the fitting piece 10 in the upper case 1. In this case, the same effect can be achieved for improving the releasing property of the fitting pieces regardless of the separation direction at the time of separating the upper case 1 and the lower case 2 without limiting the separation direction. Accordingly, the fitting twisted surface 5 can be provided not only in one portion but in two portions.

As heretofore mentioned, according to a portable terminal device of the invention, since fitting pieces are provided in both upper case and lower case for holding and fixing with each other, the fitting pieces are provided with a fitting horizontal surface to be substantially parallel when the upper case and the lower case are engaged, and a part of the fitting horizontal surface of the fitting pieces of at least one of the upper case and the lower case has a fitting twisted surface twisted in the direction away from the fitting horizontal surface of the other fitting piece in the upper case and the lower case of the main body, the effect of realizing the excellent fitting piece structure of a portable terminal device, capable of improving the releasing property of the fitting pieces of the upper case and the lower case at the time of disassembling the appliance by gradually releasing the fitting pieces without the twisted surface along the twisted surface of the fitting piece having the twisted surface in releasing the fitting pieces of the upper and lower cases at the time of disassembling the main body as well as lowering the chance of generating deformation or crack of the main body by bend or twist can be achieved while maintaining a sufficient holding force can be achieved.

What is claimed is:

1. A portable terminal device comprising;
    an upper case;
    a lower case;
    an internal unit accommodated in said upper and lower cases; and
    fitting pieces provided in both upper case and lower case which engage with each other to hold and fix said upper and lower cases with each other,
    wherein said fitting piece includes a fitting horizontal surface to be substantially parallel when the upper case and the lower case are engaged, and
    a part of the fitting horizontal surface of the fitting pieces of at least one of the upper case and the lower case has a fitting twisted surface twisted in the direction away from the fitting horizontal surface of the other fitting piece.

2. The portable terminal device according to claim 1, wherein at least one pair of the fitting pieces having the fitting twisted surface are provided in the two sides facing with each other of the upper case and the lower case.

3. The portable terminal device according to claim 1, wherein the fitting twisted surface starts to be twisted from the substantial center of the fitting surface of the fitting piece in the fitting pieces having the fitting twisted surface.

4. A portable terminal device comprising:
    an upper case;
    a lower case;
    an internal unit accommodated in said upper and lower cases; and
    fitting pieces provided on three sides of the inner wall of an outer periphery of the upper case and the lower case, which engage with each other to hold and fix the upper case and the lower case with each other,
    wherein the fitting pieces on the three sides are provided with a fitting horizontal surface to be substantially parallel when the upper case and the lower case are engaged, and
    a part of the fitting horizontal surface of the fitting pieces in two sides facing with each other among the fitting pieces on the three sides of at least one of the upper case and the lower case has a fitting twisted surface twisted in the direction away from the fitting horizontal surface of the other fitting piece.

5. The portable terminal device according to claim 4, wherein the fitting pieces having the fitting twisted surface provided in the two sides facing with each other of at least one of the upper case and the lower case are provided with the fitting horizontal surface at the end closer to the fitting pieces provided in the side other than the two sides facing with each other among the outer peripheral three sides of the upper case and the lower casein the substantially perpendicular direction, and the fitting twisted surface is provided in the direction away from the fitting pieces.

6. The portable terminal device according to claim 4, wherein at least one pair of the fitting pieces having the fitting twisted surface are provided in the two sides facing with each other of the upper case and the lower case.

7. The portable terminal device according to claim 4, wherein the fitting twisted surface starts to be twisted from the substantial center of the fitting surface of the fitting piece in the fitting pieces having the fitting twisted surface.

8. Fixing structure for fixing an upper case and a lower case with each other, comprising:

fitting pieces provided in both upper case and lower case which engage with each other to hold and fix said upper and lower cases with each other, wherein said fitting piece includes a fitting horizontal surface to be substantially parallel when the upper case and the lower case are engaged, and a part of the fitting horizontal surface of the fitting pieces of at least one of the upper case and the lower case has fitting twisted surface twisted in the direction away from the fitting horizontal surface of the other fitting piece.

9. Fixing structure for fixing an upper case and a lower case with each other, comprising:

fitting pieces provided on three sides of the inner wall of an outer periphery of the upper case and the lower case, which engage with each other to hold and fix the upper case and the lower case with each other, wherein the fitting pieces on the three sides are provided with a fitting horizontal surface to be substantially parallel when the upper case and the lower case are engaged, and a part of the fitting horizontal surface of the fitting pieces in two sides facing with each other among the fitting pieces on the three sides of at least one of the upper case and the lower case has a fitting twisted surface twisted in the direction away from the fitting horizontal surface of the other fitting piece.

10. The portable terminal device according to claim 9, wherein the fitting pieces having the fitting twisted surface provided in the two sides facing with each other of at least one of the upper case and the lower case are provided with the fitting horizontal surface at the end closer to the fitting pieces provided in the side other than the two sides facing with each other among the outer peripheral three sides of the upper case and the lower casein the substantially perpendicular direction, and the fitting twisted surface is provided in the direction away from the fitting pieces.

* * * * *